(12) United States Patent
Bijl

(10) Patent No.: US 8,220,618 B2
(45) Date of Patent: Jul. 17, 2012

(54) CONVEYOR CHAIN AND CONVEYOR FOR GRIPPING AND CONVEYING PAPER MATERIAL

(75) Inventor: Erik Jouke Bijl, Amsterdam (NL)

(73) Assignee: Neopost Technologies, Bagneux (FR)

( * ) Notice: Subject to any disclaimer, the term of this patent is extended or adjusted under 35 U.S.C. 154(b) by 76 days.

(21) Appl. No.: 12/715,035

(22) Filed: Mar. 1, 2010

(65) Prior Publication Data

US 2010/0270125 A1     Oct. 28, 2010

(30) Foreign Application Priority Data

Feb. 27, 2009    (EP) ..................................... 09153993

(51) Int. Cl.
*B65H 29/00*   (2006.01)
*B65H 29/66*   (2006.01)
*B65H 5/02*    (2006.01)
*B65H 5/04*    (2006.01)

(52) U.S. Cl. .................. 198/803.1; 198/644; 198/803.3; 198/470.1; 198/850; 271/277

(58) Field of Classification Search ............... 198/803.1, 198/803.8, 803.7, 803.3, 644, 484.1, 470.1, 198/850; 271/216, 277, 83
See application file for complete search history.

(56) References Cited

U.S. PATENT DOCUMENTS

| | | | |
|---|---|---|---|
| 1,217,993 A * | 3/1917 | Paridon | 144/62 |
| 1,760,030 A * | 5/1930 | Alger | 412/19 |
| 2,025,371 A | 12/1935 | Beidler | |
| 2,876,604 A * | 3/1959 | Engleson et al. | 53/244 |
| 2,988,199 A * | 6/1961 | Pinkham | 198/405 |
| 3,388,905 A | 6/1968 | Nash et al. | |
| 3,797,699 A * | 3/1974 | Wittern et al. | 221/85 |
| 4,534,843 A * | 8/1985 | Johnson et al. | 204/202 |
| 4,590,591 A * | 5/1986 | Leroy et al. | 367/6 |
| 4,654,227 A * | 3/1987 | Cornellier | 427/98.4 |
| 4,678,172 A | 7/1987 | Faltin | |
| 5,324,025 A * | 6/1994 | Chadwick et al. | 271/306 |
| 5,690,328 A | 11/1997 | Herda et al. | |
| 5,782,337 A * | 7/1998 | Langland | 198/803.1 |
| 6,213,461 B1 * | 4/2001 | Ratz et al. | 271/187 |
| 6,241,648 B1 | 6/2001 | Uera et al. | |
| 7,303,065 B2 * | 12/2007 | Kaufman et al. | 198/803.7 |
| 7,449,079 B2 * | 11/2008 | Fatato et al. | 156/137 |

FOREIGN PATENT DOCUMENTS

| | | |
|---|---|---|
| CH | 690301 A5 | 7/2000 |
| DE | 1 217 042 A | 6/1965 |
| DE | 2519610 A1 | 11/1976 |
| DE | 699 12 189 T2 | 5/2004 |
| EP | 0033300 A2 | 8/1981 |
| EP | 0 962 413 B1 | 10/2003 |
| FR | 2 644 443 A1 | 9/1990 |
| FR | 2 733 491 A1 | 10/1996 |

* cited by examiner

*Primary Examiner* — Mark A Deuble
(74) *Attorney, Agent, or Firm* — Sughrue Mion, PLLC

(57) ABSTRACT

A conveyor chain for gripping and conveying paper material has a plurality of links hingedly connected to each other. At least one of the links has a grip arm having a first grip surface. The grip arm is movable back and forth relative to a second grip surface of the chain between a grip position for holding paper material and a retracted position for insertion of the paper material between the first and second grip surfaces. The links are molded of plastic material. The or each grip arm is an integrally molded portion of one of the links. A conveyor including such a chain is also described.

10 Claims, 5 Drawing Sheets

CONVEYOR CHAIN AND CONVEYOR FOR GRIPPING AND CONVEYING PAPER MATERIAL

FIELD AND BACKGROUND OF THE INVENTION

The invention relates to a conveyor chain and a conveyor for gripping and conveying paper material.

In U.S. Pat. No. 6,241,648, a conveyor chain composed of hingedly connected links is disclosed of which some of the links each have a first grip member having a first grip surface. The first grip members are each movable back and forth relative to a second grip member between a gripping position for holding paper material and a retracted position for releasing the paper material. The first grip members are formed of spring-steel plate and the second grip members are made of a plate material harder than the plate material of the first grip member.

A disadvantage of such a chain is that manufacturing of the chain is quite complicated and accordingly costly. Moreover, steel chains tend to be relatively noisy when circulating in operation, which is a particular disadvantage if the conveyor is to be used in or close to an office environment.

In U.S. Pat. Nos. 3,915,447, 4,647,032 and 5,156,393, conveyor belts for gripping sheets and conveying gripped sheets are disclosed. While manufacturing costs of such belts appear to be lower than the manufacturing costs of chains equipped with grippers, engagement of the sheets tends to be less positive and relatively much friction is involved in controlling flaps of the belts for gripping and releasing sheets when required.

SUMMARY OF THE INVENTION

It is an object of the present invention to provide a low cost, yet durable solution for reliably gripping sheets, conveying the gripped sheets along a path and releasing the conveyed sheets.

According to the invention, this object is achieved by providing a conveyor chain for gripping and conveying paper material comprising a plurality of links hingedly connected to each other, at least one of the links having a grip arm having a first grip surface, the grip arm being movable back and forth relative to a second grip surface of the chain between a grip position for holding paper material and a retracted position for insertion of the paper material between the first and second grip surfaces. At least if the grip arm is in the grip position, the first and second grip surfaces face in opposite directions for engaging opposite surfaces of the paper material. The links are molded of plastic material, the grip arm being an integrally molded portion of one of the links.

The invention can also be embodied in a conveyor including such a conveyor chain and a chain support structure for supporting the chain in a configuration defining a chain path, the chain support structure and the chain being arranged for causing the grip arm to assume the grip position in a transport section of the chain path and to assume the retracted position in an inserting section of the chain path.

Because the links are molded of plastic material and the or each grip arm is an integrally molded portion of one of the links, manufacturing costs of the conveyor chain are relatively low.

Particular elaborations and embodiments of the invention are set forth in the dependent claims.

Further features, effects and details of the invention appear from the detailed description and the drawings.

DETAILED DESCRIPTION

Figure 1:
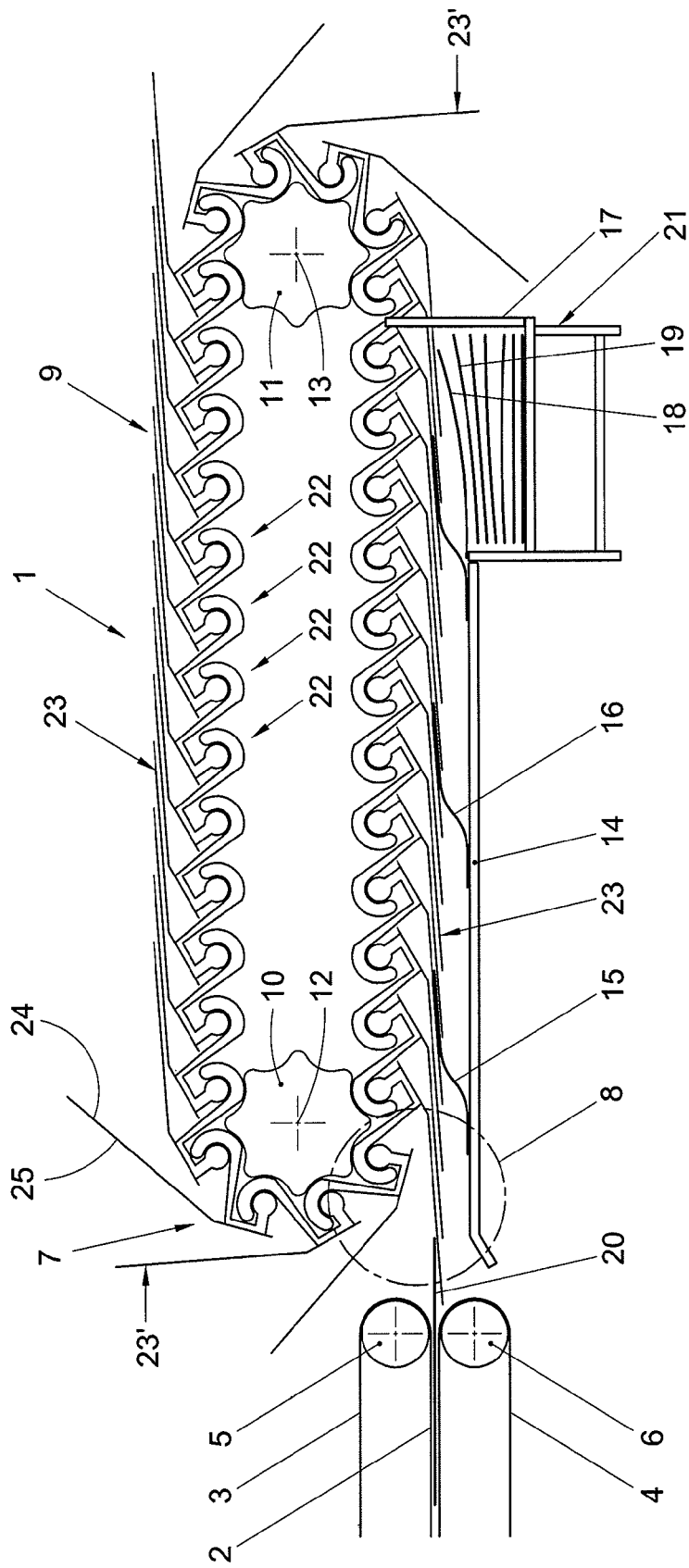
FIG. 1 is a schematic side view of an example of a conveyor according to the invention.

In FIG. 1, an example of a collator equipped with an example of a conveyor 1 according to the invention is shown. The collator has a feed path 2 between opposite belts 3, 4 (partially shown only) arranged for circulation about rotatable disks 5, 6. A downstream end of the feed path 2 converges with a conveyor chain path 7 in a grip area 8 of the conveyor chain path 7. A chain 9 is supported in a configuration defining the chain path 7, by a chain support structure constituted by sprocket wheels 10, 11 rotatably suspended and driven for rotation about axes 12, 13 perpendicular to a plane in which the chain path 7 extends.

Under a lower portion of the chain path 7, a sheet guide 14 is arranged for guiding tail portions of sheets 15, 16 gripped by the chain 9. Downstream of the sheet guide 14, an abutment 17 is arranged, in the path of the sheets 15, 16 entrained by the chain 9. A sheet 18 is shown in a position abutting the abutment 17. The abutment 17 stops the sheet 18 and causes the sheet 18 to be released from the chain 9. Thus the sheet 18, preceding sheets 19 and succeeding sheets 15, 16, 20 can be collated to form a stack. The abutment 17 is arranged adjacent to a conveyor 21 extending transverse to the plane in which chain path 7 extends. By starting circulation of the conveyor 21, a stack of sheets gathered in front of the abutment 17 can be transported away.

The sheet 20 is shown in a position in which it enters into an open gap between associated first and second grip surfaces of the chain 9. The first and second grip surfaces are facing in essentially diametrically opposite directions for engaging opposite sides of the sheet 20. Although in the present example, the paper material engaged by the chain 9 is constituted by single sheets, it is also possible within the framework of the invention to provide that multi-layered paper items, such as folded sheets, bound sheets or envelopes are engaged by the chain 9, transported and removed from the chain 7.

Figure 2:
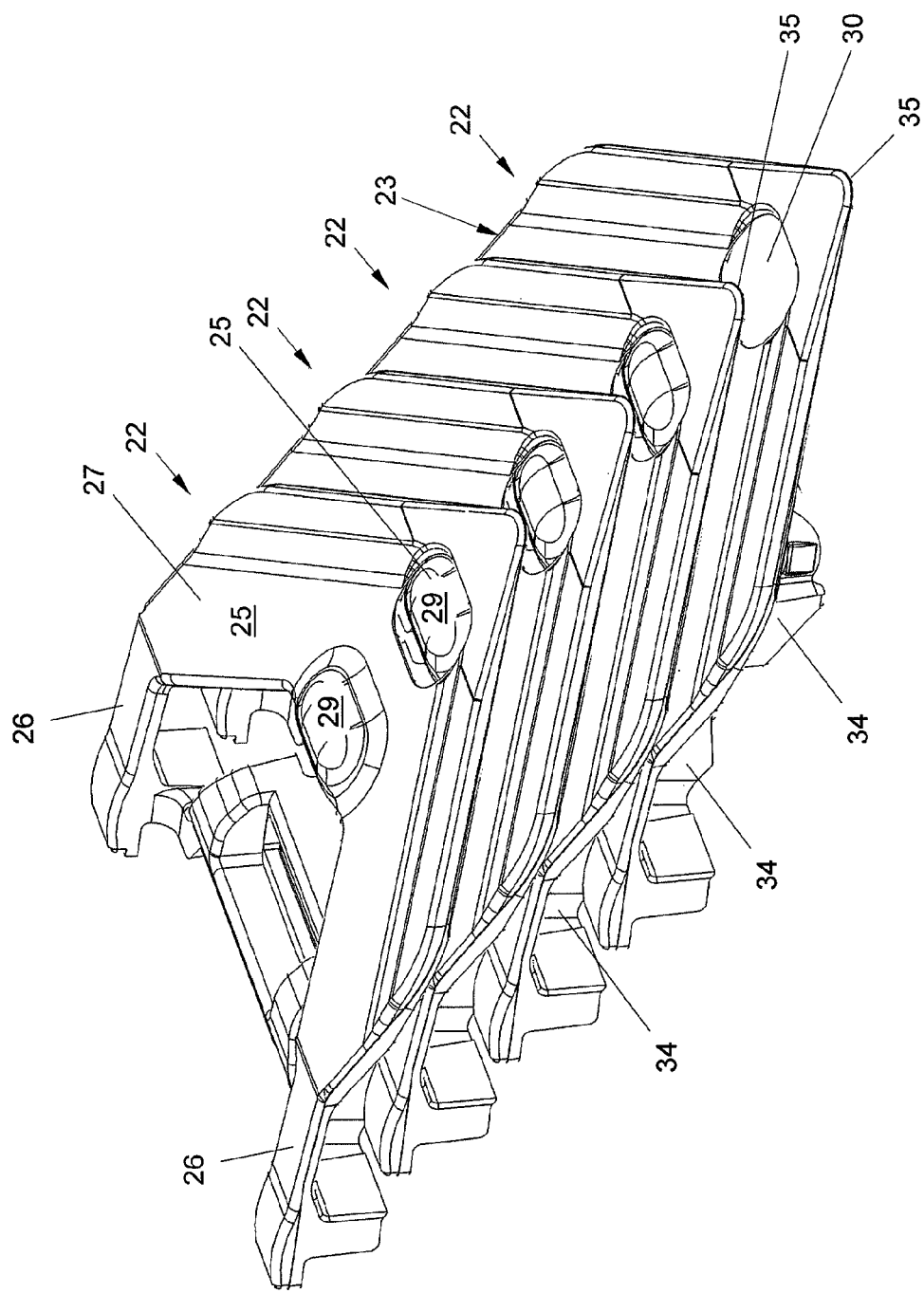
FIG. 2 is a perspective view of a section of an example of a conveyor chain according to the invention.
Figure 3:
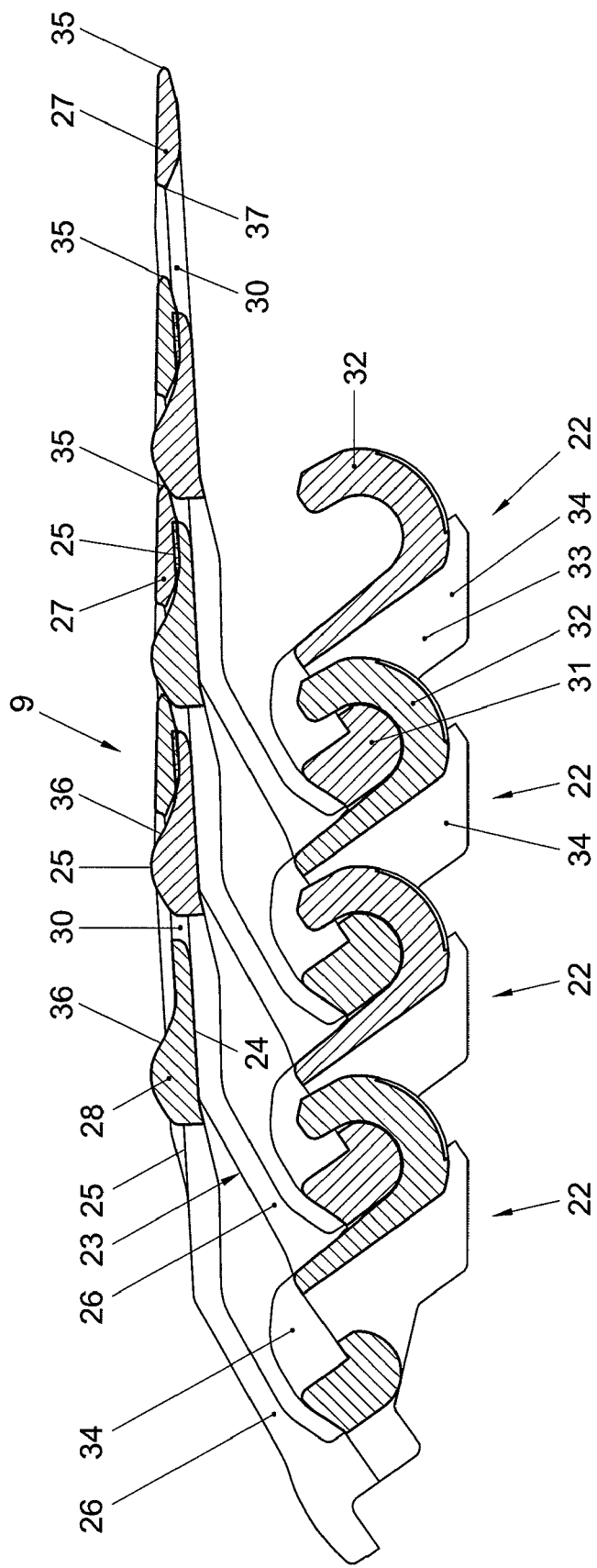
FIG. 3 is a side view in cross-section along a mid-plane of the conveyor chain section of FIG. 2.
Figure 4:
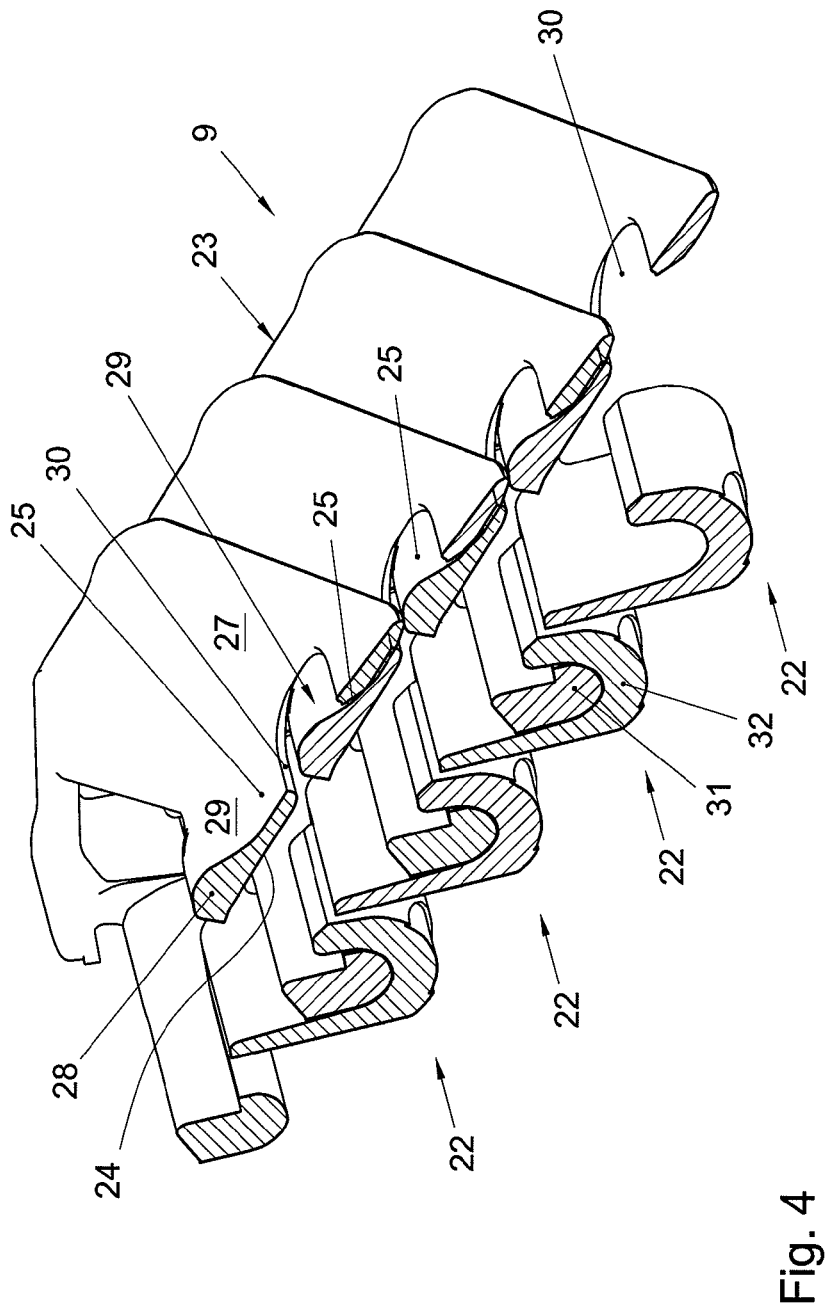
FIG. 4 is a perspective view in cross-section along a mid-plane of the conveyor chain section of FIGS. 2 and 3.

Further details of the conveyor chain 9 and its operation become apparent from FIGS. 2-4 which show a section of the conveyor chain 9. The conveyor chain 9 is composed of a plurality of links 22 hingedly connected to each other. In FIG. 1 four of the links are designated by reference numerals only. For the sake of clarity, in FIGS. 2-4 each time only one or a few of the various members and portions of a link 22 discussed below, which may be shown for some or all four of the links 22, are designated by reference numerals. Some of the members and elements are also designated by a reference numeral in FIG. 1. Where, in FIGS. 3 and 4, portions of the links 22 are intersected by the plane of drawing alternating sets of hatchings in mutually identical directions indicate which portions are part of the same links 22.

The links 22 each have a grip arm 23 having a first grip surface 24. The grip arm 23 is movable back and forth relative to a second grip surface 25 between a gripping position 23 for holding paper material (see FIGS. 2-4) and a retracted position 23' (see FIG. 1) for releasing the paper material 15, 16, 19, 20.

The grip arms 23 are of plastic material, have a proximal portion constituted by two-beams 26 and a generally triangular distal portion 27 bridging the distal ends of the beams 26. Because the grip arms 23 are at least partially made of plastic material, the links 22 equipped with grip arms 23 can be manufactured at relatively low costs. This is particularly advantageous if a large number of the links, and more particularly, if, as in the present example, each of the links 22 is equipped with a grip arm 23.

Figure 5:
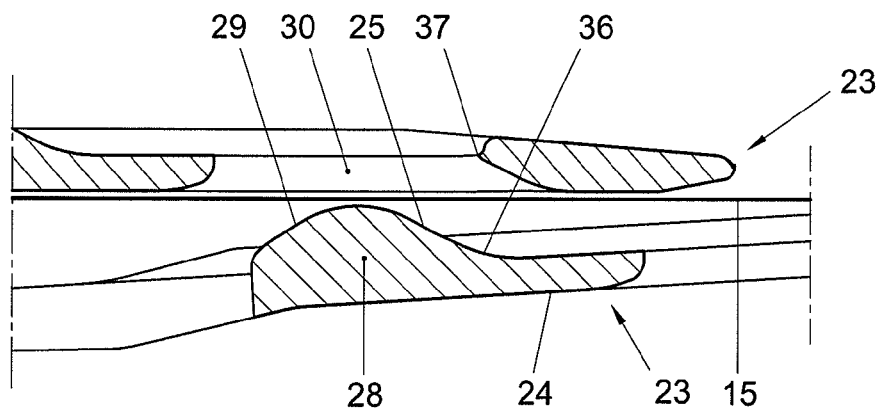
FIG. 5 is an enlarged view of a portion of a conveyor chain according to FIGS. 2-4 and a portion of a sheet of paper engaged thereby.

If the grip arm 23 is in the gripping position, the first and second grip surfaces 24, 25 face in opposite directions for engaging opposite surfaces of the paper material, such as the sheet 15 shown in FIGS. 1 and 5, which is engaged by the first and second grip surfaces 24, 25.

As is shown in FIGS. 2-4, a portion of each of the second grip surfaces 25 is constituted by a surface 29 of a projection 28, which projects into a hole 30 in the first grip surface 24, if the grip arm 23 is in the gripping position and no paper is held by the first and second grip surfaces 24, 25. As is best seen in FIGS. 3 and 4, the portions 29 on the projections 28 of the second grip surfaces 25 each protrude into the respective hole 30 in the first grip surface 24 if the grip arm 23 is in the grip position and no sheet of paper is present. In contrast, as is best seen in FIG. 5, if a sheet of paper 15 is held by the first and second grip surfaces 24, 25, the grip arm 23 in the grip position is deflected to some extent, because the sheet of paper obstructs the hole 30, so the projection 28 cannot enter the hole 30, at least not over a substantial distance. This causes the grip arm 23 to press the first grip surface 24 against the sheet with sufficient force to reliably hold the sheet. For engaging sheets of A4 size, the clamping force exerted on a sheet is preferably between 0.5 and 1.5 N.

Because the projections can each project into one of the holes when no paper is engaged by the first and second grip surfaces, pre-tension exerted onto the grip arm is reduced when no paper is engaged, while any paper between the projection and the hole prevents the projection from entering the hole over a substantial distance. Accordingly, relaxation of the gripping pressure over time due to creep deformation of the plastic material while the conveyor is out of operation, in which situation there is typically no paper held by the conveyor chain, is at least counteracted. The grip arm carrying the first grip surface is at least subjected to less stress in the gripping position when the apparatus is out of operation than while holding a sheet. Therefore, the conveyor chain is durable in-spite of being of a material which would be prone to creep deformation if subjected to deformation substantially at the same level as required for exerting the force needed for reliably holding the paper material.

In the present example, the grip arms 23 in the grip position are not or to a far lesser extent deflected if no sheet of paper is held by the first and second grip surfaces 24, 25, the grip arms 23 in the grip position are not or at least to a far lesser extent subjected to long-term bending stress if the apparatus is out of operation, in which situation the conveyor chain is typically free of paper items held thereby. Accordingly, the grip arms can be made of plastic material while avoiding or at least limiting a reduction over time of the force exerted by the grip arms onto sheets held thereby due to long-term creep deformation of the plastic material. Accordingly, the arms 23 can, at least partially, be manufactured of plastic material, such as POM, preferably combined with PTFE to prevent squeaking, which do not have to be particularly creep resistant at room temperature.

However, long-term relaxation of pressure exerted by opposing grip surfaces may also be counteracted by providing the arm or arms and optionally other parts of the links with reinforcements such as metal cores or fiber materials such a fiberglass, albeit at generally higher costs.

If the first grip surface and the second grip surface that are arranged for holding a sheet of paper material by engaging oppositely facing surfaces of the sheet are surface portions of adjacent (in the sense of not distant or nearby) ones of the links, movement of the first grip surface on the arm can be achieved by pivoting movement of the link of which the arm is a part, relative to the link of which the second grip surface arranged for co-operation therewith is a part. Thus, a movable connection between the arm and the rest of the link of which the arm is part is not required so the construction of the link can be kept very simple.

Although, in the present example, the paper is removed from the chain while engaged by first and second grip surfaces 24, 25 while the grip arm 23 is in the gripping position, the movement to the retracted position may also be used for releasing the paper material or for facilitating removal of the paper material from the chain The chain support structure formed by the rollers 10, 11 and the chain 9 are arranged for causing the grip arms 23 to assume the grip position in a transport section of the chain path 7 and to assume the retracted position 23' in a receiving section of the chain path 7. Thus, the arms 23 are caused to move between the gripping position and the retracted position by the configuration in which the chain 9 is supported. This provides the advantage that no additional (generally friction and wear inducing) guides are required for controlling movement of the grip arms 23 between the gripping position and the retracted position.

As is best seen in FIG. 3, the first grip surface 24 of each grip arm 23 is located for co-operation with a second grip surface 25 of a neighboring link 22 and of such a length that its distal end reaches a next one of the links 22. Since the grip arms 23 have a relatively great length in longitudinal direction of the chain 9, relatively small angular movements of a link 22 are sufficient for moving the first grip surface 24 on the grip arm 23 projecting from that link 22 relative to the second grip surface 25 located for co-operation therewith, over sufficient distance to reliably receive a sheet in a position extending between the first and second grip surfaces 24, 25.

The grip arms 23, the first grip surfaces 24 and the second grip surfaces 25 are arranged such that the grip arms 23 of the links 22 in the straight sections of the conveyor chain 9 are in the grip position and the grip arms 23 of the links 22 in the curved sections of the conveyor chain section are in the retracted position. Thus, sheets can be fed to the conveyor chain in a section where the chain is in a curved configuration. This allows the sheet feeding path 2 and the conveyor chain to converge gradually while a chain section along which received sheets are transported is substantially in-line with the document feeding path 2. This allows sheets 20 to be fed to the conveyor chain 9 and to be transported further by the conveyor chain 9 with no or very little bending of the sheet 20. This is of particular advantage if the paper items are relatively stiff and/or folded and/or multi-layered items.

The conveyor chain 9 according the present example can be manufactured at particularly low costs, because the links 22 are molded of plastic material, the grip arms 23 being integrally molded portions of the links 22. For reducing the costs of manufacturing and maintenance, it is moreover advantageous, that at least all the links of the conveyor chain that each include a gripper arm, and more preferably, as in the present example, all the links of the conveyor chain, are mutually identical.

Hinged connections between successive ones of the links 22 are formed by mutually engaging hook portions 31, 32 of the successive links 22. In the present examples the hook members are constituted by axle members 31 hooked in hooks 32 that have an open side facing the grip arms 23 of the respective link 22. As is best seen in FIG. 3, successive links 22 can be assembled by inserting an axle portion 31 of a next link 22 into a hook 32 of a link 22 at an end of the completed chain section, the link 22 to be attached being in an orientation in which the grip arm 23 points away from the grip arm 23 of the link 22 constituting the current end of the chain section. Then the link 22 of which the axle portion 31 has been lodged in a recess of the hook 32 of the link at the end of the chain is rotated such that its grip arm 23 rotates against the grip arm 23 of the link 22 to which the newly attached link has just been attached. This also prevents the grip arm 23 of the now penultimate link 22 of the chain from pivoting away from the next grip arm 23, so that the penultimate link 22 is now locked in position and cannot be unhooked from the next link 22. This principle applies mutatis mutandis to all next links in the chain section except the last one at the other end of the chain. However, as soon as the ends of the chain have been attached to each other, all links 22 of the chain tensioned along a chain path are locked against uncoupling from the neighboring link.

The location of the pivotable connections between the successive links 22 and the positions and orientations of the grip arms 23 are such that if the chain is tensioned in a straight configuration, the grip arms 23 are in the gripping position and, in absence of paper material held by the first and second grip surfaces 24, 25, the first and second grip 24, 25 surfaces are free from mutual contact pressure. Thus, the arms 23 are not loaded by mutually exerted contact pressure between the first and second grip surfaces 24, 25 if the empty chain is tensioned. However, because the arms 23 are in the grip positions, successive grip arms 23 prevent each other from rotating and prevent that the axle portions 31, which are connected to the hooks 31 and the grip arms 23 of the respective link 22 via flanges 34, can unhook from the hooks 32.

While, according to the present example, the projection 28 is in the form of an embossment, the projection can also be provided in another form, for instance in the form of a stud or of a free end of a bar. Moreover, it is also possible to provide a plurality of projections, each projecting into an associated hole in the second grip surface if the grip arm is in the gripping position and no sheet of paper extends between the first and second grip surfaces 24, 25.

As is illustrated by FIG. 2-5, the projection 28 is provided in the form of an embossment. This provides the advantage that the remaining generally flat portion of the second grip surface 25, relative to which the embossment projects, limits the extent to which the sheet 15 can bend and accordingly the extent to which the embossment 28 can penetrate into the hole 30 opposite the embossment 28 if a sheet of paper 15 is between the embossment 28 and the hole 30.

The extent to which the embossment 28 can penetrate into the hole 30 opposite the embossment 28 if a sheet of paper 15 is between the embossment 28 and the hole 30 is further limited, because the hole 30 has a rim 37 facing the projection 28, which, seen in plan view relative to the grip surfaces 24, 25, extends around the hole 30. Thus, to bend into the hole 30, the sheet 15 would have to bend into several directions or form pleats. However, paper material is too stiff to deform significantly into a shape with curvature in more than one direction and, due to its stiffness, quite strongly resists the formation of pleats in close proximity of a locally applied load.

Furthermore, the embossment 28 is sloping at a side 36 of the embossment 28 oriented towards a free end 35 of the grip arm 23 on which the other one of the co-operating first and second grip surfaces 24, 25 is located. This provides the advantage, that sheets 15 can easily be inserted between the first and second grip surfaces 24, 25 without abutting against the projection 28.

While the invention has been illustrated and described in detail in the drawings and foregoing description, such illustration and description are to be considered illustrative or exemplary and not restrictive; the invention is not limited to the disclosed embodiments. For example, not all the links need to be identical, only one or only a few of the links can be equipped with a grip arm, the grip arm may be pivotable and operated by a guide along the chain path, the grip arms may include parts of other materials than plastic, such as inserts of material exhibiting a high friction relative to paper, the hole may be a recess having a closed end instead of an open passage as in the present example, the positions of the hole and the projection may be mutually exchanged, and/or the first and second grip surface may be free of any portions facing each other diametrically.

Other variations to the disclosed embodiments can be understood and effected by those skilled in the art in practicing the claimed invention, from a study of the drawings, the disclosure, and the appended claims.

The invention claimed is:

1. A conveyor chain for gripping and conveying paper material comprising a plurality of links directly hinged to each other, each of the links having a grip arm having a first grip surface, the grip arm being movable back and forth relative to a second grip surface of the chain between a grip position for holding paper material and a retracted position for insertion of the paper material between the first and second grip surfaces;
    wherein, at least if the grip arm is in the grip position, the first and second grip surfaces face in opposite directions for engaging opposite surfaces of the paper material; and
    wherein the links are mutually identical and molded of plastic material, the grip arm being an integrally molded portion of one of the links.

2. A conveyor chain according to claim 1, wherein the first grip surface and the second grip surface arranged for engaging oppositely facing surfaces of a sheet of paper material are surface portions of adjacent ones of the links, and wherein the grip arm, the first grip surface and the second grip surface are arranged such that hinging movement of said adjacent links causes the movement of the grip arm relative to the second grip surface of the chain between the grip position and the retracted position.

3. A conveyor chain according to claim 2, wherein at least one further link is connected between said adjacent links.

4. A conveyor chain according to claim 2, wherein the grip arm, the first grip surface and the second grip surface are arranged such that, if a chain section is in a straight configuration, the at least one grip arm of the links in that straight chain section are in the grip position and, if the chain section is in a curved configuration, the at least one grip arm of the links in that curved chain section are in the retracted position.

5. A conveyor chain according to claim 1, wherein if the grip arm is in the gripping position, in absence of paper material held by the first and second grip surfaces, the first and second grip surfaces exert no mutual contact pressure.

6. A conveyor chain for gripping and conveying paper material comprising a plurality of links hingedly connected to each other, at least one of the links having a grip arm having a first grip surface, the grip arm being movable back and forth relative to a second grip surface of the chain between a grip position for holding paper material and a retracted position for insertion of the paper material between the first and second grip surfaces;

wherein at least if the grip arm is in the grip position, the first and second grip surfaces face in opposite directions for engaging opposite surfaces of the paper material;

wherein the links are molded of plastic material, the grip arm being an integrally molded portion of one of the links; and wherein, at least a portion of the first grip surface or the second grip surface is constituted by a surface of a projection, which projects into a hole in the second grip surface or, respectively, first grip surface, if the grip arm is in the gripping position in absence of paper material held by the first and second grip surfaces.

7. A conveyor chain according to claim 6, wherein the projection is an embossment which, at a side of the embossment oriented towards a free end of the grip arm having the other one of the first and second grip surfaces is sloping.

8. A conveyor chain for gripping and conveying paper material comprising a plurality of links hingedly connected to each other, at least one of the links having a grip arm having a first grip surface, the grip arm being movable back and forth relative to a second grip surface of the chain between a grip position for holding paper material and a retracted position for insertion of the paper material between the first and second grip surfaces;

wherein, at least if the grip arm is in the grip position, the first and second grip surfaces face in opposite directions for engaging opposite surfaces of the paper material;

wherein the links are molded of plastic material, the grip arm being an integrally molded portion of one of the links;

wherein at least all of the links each including a grip arm are mutually identical: and wherein hinged connections between successive ones of the links are formed by mutually engaging hook portions of the successive links.

9. A conveyor comprising:

a conveyor chain for gripping and conveying paper material comprising a plurality of links directly hinged to each other, each of the links having a grip arm having a first grip surface, the grip arm being movable back and forth relative to a second grip surface of the chain between a grip position for holding paper material and a retracted position for insertion of the paper material between the first and second grip surfaces;

wherein, at least if the grip arm is in the grip position, the first and second grip surfaces face in opposite directions for engaging opposite surfaces of the paper material; and wherein the links are mutually identical and molded of plastic material, the grip arm being an integrally molded portion of one of the links, and a chain support structure for supporting the chain in a configuration defining a chain path, the chain support structure and the chain being arranged for causing the grip arm to assume the grip position in a transport section of the chain path and to assume the retracted position in an inserting section of the chain path.

10. A conveyor according to claim 9, wherein the first grip surface and the second grip surface arranged for engaging oppositely facing surfaces of a sheet of paper material are surface portions of adjacent ones of the links, wherein the grip arm, the first grip surface and the second grip surface are arranged such that hinging movement of said adjacent links causes the movement of the grip arm relative to the second grip surface of the chain between the grip position and the retracted position, wherein the grip arm, the first grip surface and the second grip surface are arranged such that, if a chain section is in a straight configuration, the at least one grip arm of the links in that straight chain section are in the grip position and, if the chain section is in a curved configuration, the at least one grip arm of the links in that curved chain section are in the retracted position, and wherein the transport section is a straight section of the chain path, and wherein the inserting section is a curved section of the chain path.

* * * * *